United States Patent [19]
Zaffaroni

[11] 3,929,984
[45] Dec. 30, 1975

[54] INTRAUTERINE DEVICE AND METHOD FOR RELEASING PHARMACEUTICALLY ACCEPTABLE CONTRACEPTIVE HETEROGENOUS COMPOUNDS

[75] Inventor: Alejandro Zaffaroni, Atherton, Calif.

[73] Assignee: Alza Corporation, Palo Alto, Calif.

[22] Filed: Oct. 16, 1973

[21] Appl. No.: 406,831

Related U.S. Application Data

[63] Continuation-in-part of Ser. No. 201,054, Nov. 22, 1971, abandoned, and a continuation-in-part of Ser. No. 188,425, Oct. 12, 1971, abandoned, and a continuation of Ser. No. 886,358, Dec. 18, 1969, abandoned.

[52] U.S. Cl. .................. 424/22; 128/260; 424/19
[51] Int. Cl.² ........................................... A61K 9/22
[58] Field of Search .......................... 424/19–22, 424/16; 128/260, 130, 131

[56] References Cited
OTHER PUBLICATIONS
Ryan et al., Amer. Jl. Obstet. Gynec. (105(1):121–123, Sept. 1, 1969, "Adenosine 3'5' Monophosphate as an Inhibitor of Ovulation and Reproduction".
Pearse et al., Amer. Jl. Obstet. Gynec. 109(5):724–731, Mar. 1, 1971, "The Mode of Action of Cyclic Amp as a Contraceptive".

*Primary Examiner*—Shep K. Rose
*Attorney, Agent, or Firm*—Paul L. Sabatine; Edward L. Mandell

[57] ABSTRACT

An intrauterine delivery device for the administration of anti-fertility agent to the uterine cavity comprising a body of non-toxic, biologically inert, polymeric release rate controlling material containing therein a locally acting anti-fertility agent and permeable to the passage of the agent by diffusion, and wherein the agent has the structural formula:

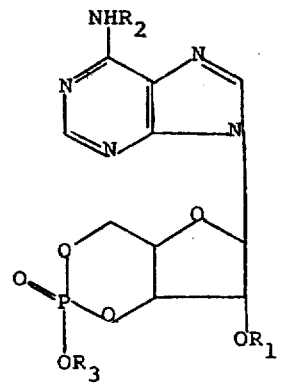

wherein $R_1$ is hydrogen, lower alkyl or aliphatic acyl; $R_2$ is hydrogen, lower alkyl, or aliphatic acyl; and $R_3$ is hydrogen or lower alkyl; and pharmaceutically acceptable acid addition salts thereof; and wherein the device, while in the uterus, continuously meters the flow of a contraceptively effective amount of the locally active agent through the material at a controlled and predetermined rate over a period of time to produce a local anti-fertility effect.

4 Claims, 4 Drawing Figures

INTRAUTERINE DEVICE AND METHOD FOR RELEASING PHARMACEUTICALLY ACCEPTABLE CONTRACEPTIVE HETEROGENOUS COMPOUNDS

CROSS REFERENCE TO RELATED APPLICATIONS

This application is a continuation-in-part of U.S. patent application Ser. No. 201,054 filed on Nov. 22, 1971, a continuation-in-part of U.S. patent application Ser. No. 188,425 filed on Oct. 12, 1971, and a continuation of U.S. patent application Ser. No. 886,358 filed on Dec. 18, 1969, all now abandoned. These applications are assigned to the same assignee of this application and these applications are incorporated into this application by reference.

BACKGROUND OF THE INVENTION

This invention relates to a contraceptive device and intrauterine method and more particularly to a device and method for the predetermined controlled metering of the flow of a contraceptively effective amount of a locally active pharmaceutically acceptable anti-fertility agent to the animal uterus over a prolonged and continuous period of time, the agent comprising a heterogenous compound as defined hereinafter.

Intrauterine contraceptive devices of various configurations have become an increasingly popular means usable as a method of birth control. While generally reliable when in proper place, such devices are frequently expelled by the patient due to uterine contractions. This is a significant problem since the patient often is unaware that the device has been expelled. One approach to this problem has been to incorporate either a progestational or estrogenic agent in the device in a manner such that a continuous low dose of the steroid hormone is delivered to the uterus to reduce the uterine contractility and expulsion of the devices. Reduction of uterine contractility also is helpful in reducing inflammation and uterine punctures which are sometimes attendant with the use of intrauterine devices. See Doyle et al., *Amer. J. Obstet. Gynecol.*, Vol. 101, pages 564 to 568, 1968.

Other investigators have incorporated progestational or estrogenic steroidal agents in intrauterine devices with a view to controlling fertility by the steroidal hormonal effect of the progestational or estrogenic agent. Such work has been extended to other drug delivery systems including vaginal inserts and cervical rings, that is, progestogen or estrogenic releasing rings placed at the head of the cervix, and surgical implants, placed in skin area or elsewhere in the body.

In the main, progestational or estrogenic agents used in these prior studies have been the highly potent synthetic progestational or estrogenic agents such as chlormadinone acetate, megestrol acetate, melengestrol acetate, estrone, estrodiol, and medroxyprogesterone acetate. Such compounds have long half-lives in the body and are known to produce systemic progestogen or estrogenic effects. Even when applied to the uterus or vagina, it is not unreasonable to expect that continuous administration of these highly active compounds may produce some unwanted side reactions. One investigator has used progesterone as the progestational agent in such devices. See Scommegna et al., "Intrauterine Administration of Progesterone by a Slow Releasing Device", presented at annual meeting of the American Fertility Society, April, 1969.

Now, it has been found that many of the above disadvantages often known to the art can be substantially overcome by using non-steroidal compounds, particularly, heterogenous compounds for interfering with the female reproductive process. The use of heterogenous compounds, particularly those containing a nitrogen entity, for the purpose of this invention, that is, as anti-fertility control, is unexpectedly locally achieved substantially free of systemic effects. Additionally, it has been unexpectedly found that heterogenous anti-fertility compounds can be incorporated into various and different intrauterine devices and released therefrom for interfering with the female reproductive process. These compounds, as used according to the mode and manner of the present invention, have the additional advantage of acting locally essentially free of systemic activity.

SUMMARY OF THE INVENTION

Accordingly, it is an immediate object of this invention to provide an improved birth control device which locally administers a locally contraceptively active useful agent to the uterine wall.

Yet still another object of the invention is to provide an improved birth control device and method that is achieved locally essentially free of ovulation suppression.

Still another object of the present invention is to provide an intrauterine device containing a biologically acceptable heterogenous compound that is released by diffusion from the device in an amount effective for anti-fertility effects within the uterus while simultaneously substantially avoiding the side effects generally known to the art.

Yet still another purpose of the invention is to provide an intrauterine device charged with a physiological acceptable non-steroidal compound for interfering with the female animal reproductive process at a local situ while simultaneously avoiding systemic effects.

Another object of this invention is to provide a birth control device containing and releasing a local fertility controlling active agent but having substantially no systemic progestational activity, and substantially no estrogenic activity.

One object of this invention is to provide an improved birth control device which locally applies an anti-fertility agent to the uterine walls in useful, low dosage.

Another object of this invention is to provide a birth control device containing and gradually releasing an antifertility agent having local fertility controlling activity but substantially no systemic estrogenic activity and substantially free of influencing systemic organs and systemic functions.

In attaining these objects, features and advantages of the invention, one aspect of this invention resides in an intrauterine device for the predetermined controlled metering of the flow of a contraceptively effective amount of anti-fertility agent to the uterus over a prolonged period of time, comprising a body of non-toxic biologically inert, polymeric release rate controlling material permeable to the passage of the agent by diffusion which device is itself of a shape for retention and insertion in the fertile uterus, or alternatively, which is attached to a suitable shape for insertion and retention in the uterus containing therein a pharmaceutically acceptable anti-fertility agent having local fertility controlling activity of the formula:

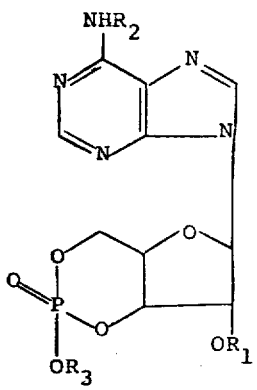

wherein
$R_1$ is hydrogen, lower alkyl or aliphatic acyl;
$R_2$ is hydrogen, lower alkyl, or aliphatic acyl; and
$R_3$ is hydrogen or lower alkyl; and pharmaceutically acceptable acid addition salts thereof; and wherein the antifertility agent is metered by the polymeric material to the female uterus in an effective amount for controlling fertility at the uterine situ.

Other objects, feature and advantages of this invention will become more apparent from the following description, the drawings and the accompanying claims.

BRIEF DESCRIPTION OF THE DRAWINGS

In the drawings which are not drawn to scale, but rather are set forth to illustrate various embodiments of the invention, there appears as follows:

FIG. 3 is an enlarged cross-sectional view of the bracketed segment of the intrauterine device of FIG. 1, illustrating according to the invention a locally contraceptively active anti-fertility agent distributed throughout a release rate controlling polymeric material of the intrauterine device.

In the drawings and specifications, like parts in related Figures are identified by like numbers. The terms appearing earlier in the specification and in the description of the drawings, as well as embodiments thereof, are further described elsewhere in the disclosure.

DETAILED DESCRIPTION OF THE INVENTION

Figure 1:
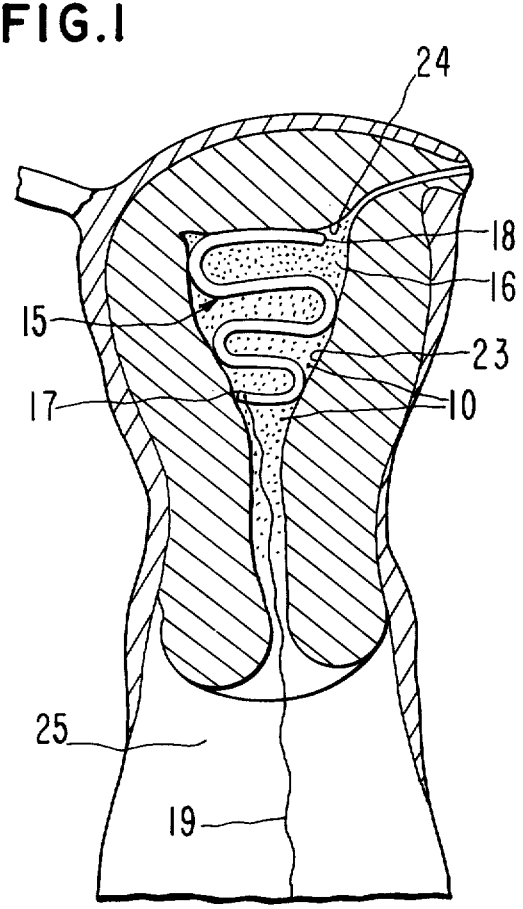
FIG. 1 is a side elevational view showing an intrauterine device of the loop type as disclosed in U.S. Pat. No. 3,250,271, in operative position within the uterus.

In accordance with the present invention, there is provided an intrauterine device for the predetermined controlled and continuous metering of the of a contraceptively effective amount of locally contraceptively active pharmaceutically acceptable anti-fertility agent to the mammalian uterus over a prolonged period of time. The intrauterine device is comprised of a body of non-toxic, biologically inert uterine acceptable polymeric release rate controlling material containing therein a locally active anti-fertility agent and permeable to the passage of the agent as by diffusion and having the formula:

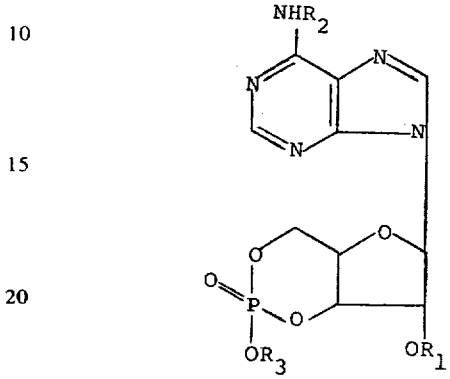

wherein
$R_1$ is hydrogen, lower alkyl or aliphatic acyl;
$R_2$ is hydrogen, lower alkyl, or aliphatic acyl; and
$R_3$ is hydrogen or lower alkyl; and pharmaceutically acceptable acid addition salts thereof.

The locally contraceptively active anti-fertility agent is confined within an uterine acceptable polymeric material so that when inserted in the uterus of a fertile animal, including mammals and primates, capable of species reproduction, the material continuously meters the flow of an effective amount of the contraception agent to the uterus by passage by diffusion of the agent through the polymeric material at a controlled rate. When the locally, contraceptively active agents are applied locally to the uterus they do not produce any significant unwanted systemic activity. By locally delivering these agents from devices known as intrauterine devices as effective, reliable and safe means of birth control is provided.

In the active compound of the invention, lower alkyl is comprised of a straight or branched chain alkyl of 1 to 7 carbons inclusive such as methyl, ethyl, propyl, isopropyl, butyl, hexyl and the like. When $R_1$ and $R_2$ are aliphatic acyl including without limitations of 1 to 18 carbons such as acetyl, propionyl, butyryl, valeryl, hexanoyl, octanoyl, lauroyl, palmitoyl, steroyl, arachidoyl, palmitoleoyl, oleoyl, ricinoleoyl, linoleoyl, linolenoyl, eleostearoyl, and the like. Of course, the acyl radical includes the residue of hydrocarbon carboxylic acids, such as alkanoyl, alkenoyl, and the like. These residues are known to the art in U.S. Pat. Nos. 2,873,271 and 3,415,818 and the like.

Exemplary anti-fertility agents for use in this invention are: adenosine-3',5'-monophosphate; 2'-O-monoacetyl-adenosine-3',5'-monophosphate; $N^6$-monoacetyl-adenosine-3',5'-monophosphate; $N^6$-2'-O-diacetyl-adenosine-3',5'-monophosphate; 2'-O-monobutyryl-adenosine-3',5'-monophosphate; $N^6$-monobutyryl-adenosine-3',5'-monophosphate; $N^6$-2'-O-dibutyryl-adenosine-3',5'-monophosphate; $N^6$-monohexanoyl-adenosine-3',5'-monophosphate; $N^6$-2'-O-dihexanoyl-adenosine-3',5'-monophosphate; 2'-O-mono-octanoyl-adenosine-3',5'-monophosphate; $N^6$-2'-O-dioctanoyl-adenosine-3',5'-monophosphate;

$N^6$-monolauryl-adenosine-3′,5′-monophosphate; $N^6$-monostearyl-adenosine-3′,5′-monophosphate; 2′-O-monooleoyl-adenosine-3′,5′-monophosphate; adenosine-3′,5′-monomethylphosphate; adenosine-3′,5′-monoethylphosphate. The presently preferred for use in this invention is the body's natural hormone regulator adenosine-3′,5′-monophosphate (cyclic AMP); that is, the compound wherein $R_1$, $R_2$, and $R_3$ each are hydrogen. These compounds are commercially available and they can easily be prepared by processes fully described in *J. Biol. Chem.*, Vol. 94, page 809, 1932; *Ber.*, Vol. 66, page 198, 1933; *Z. Physiol. Chem.*, Vol. 223, page 61, 1934; *J. Chem. Soc.*, page 765, 1936; *J. Chem. Soc.*, page 355, 1947; U.S. Pat. Nos. 2,549,827; 3,079,379; *J. Biol. Chem.*, Vol. 101, page 419, 1933; *J. Chem. Soc.*, page 648, 1947; and other standard references.

The above compounds can also be used in the pharmaceutically acceptable derivative thereof. Such derivatives should convert to the parent compounds upon release from the intrauterine device by enzymatic transformation, pH assisted hydrolysis, and the like body functions. They are used to enhance the release properties of the metabolite from uterine devices. Exemplary salts are mineral acid addition salts such as the hydrochloride, hydrobromide, hydroiodide, sulfate, sulfamate, and phosphate, and the organic acid addition salts such as the acetate, cycloacetate, propionate, butyrate, valerate, hexanoate, octanoate, succinate, tartrate, ascorbate, maleate, citrate, fumarate, malate, glucuronate, hemi-$\beta,\beta$-dimethyl gluturate, sulphate, phosphate, cyclohexylammonium phosphate, and the like.

The polymeric release rate controlling material can be of suitable shape known to those skilled in the art to promote retention in the uterine cavity over a short to a prolonged period of time. Alternatively, the polymeric release rate controlling material can be attached to an intrauterine device which is effective for short to long term retention of said material in the uterine endometrial cavity. In general, suitable devices can be obtained by distributing the antifertilty agent in a solid or gel matrix of the polymeric rate controlling material; microencapsulating the agent and then distributing the microcapsules in the polymeric rate controlling material or confining the agent in crystalline form in a hollow container within the polymeric rate controlling material.

With regard to known shpaes for promoting retention in the cavity, such devices can take various configurations, such as the conventional Lippes' "loop", as disclosed in U.S. Pat. No. 3,250,271, Marguiles' "spiral", as disclosed in U.S. Pat. No. 3,200,815, Birnberg's "bow", as disclosed in U.S. Pat. No. 3,230,953, etc., or matrix containing the agent suitably affixed to these conventional intrauterine devices. However, the particular configuration or shape of the device forms no part of the present invention. The main purpose of the device, in this invention, is to provide a depot or carrier for the continuous administration of the anti-fertility agent as defined hereinafter to the uterus at a predetermined and controlled rate. Devices which in themselves are effective birth control means, such as the Lippes' loop, have their usefulness enhanced while other shapes are rendered effective in the first instance.

Figure 2:
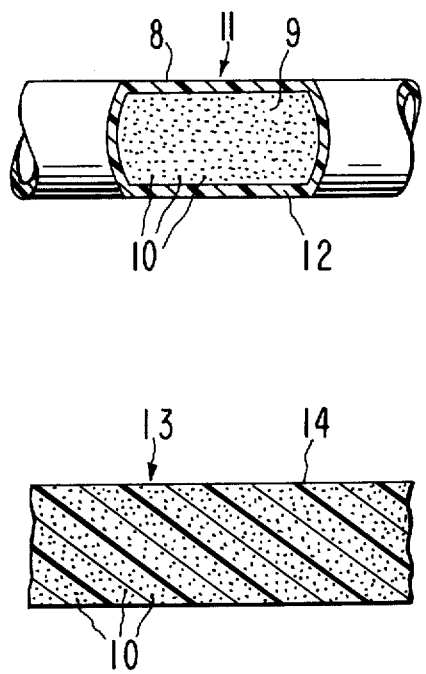
FIG. 2 is an enlarged perspective view of the bracketed segment of the intrauterine device of FIG. 1, illustrating according to this invention the anti-fertility, locally contraceptively active agent confined in the lumen of the material of the intrauterine device.

For ease of presentation, the invention is described with reference to a specific intrauterine shape, which has arbitrarily been selected to be the loop disclosed by Lippes in U.S. Pat. No. 3,250,271. Another suitable intrauterine device is disclosed in copending application Ser. NO. 61,141, filed Aug. 5, 1970, now U.S. Pat. No. 3,675,647, for an invention of Bruce B. Pharriss and Max Anliker. The disclosure of that copending application is relied upon and incorporated herein by reference. However, it will be appreciated that this is in no way to be construed as limiting the teaching of this invention. FIG. 1 generically depicts an intrauterine device 15 nesting within uterine cavity 16. Device 15 is made of a flexible material and has a memory for retaining its shape in uterine cavity 16. The illustrated cavity 16 is of standard anatomy having sides 23 as well as fundus uterus 24. The cavity leads to vagina 25. A thread 19 is attached to the trailing end 17, distant from lead end 18 of device 15 for manually removing device 15 from uterus 16. FIGS. 2 and 3 illustrate various embodiments detailing several structures for the loop shaped body.

FIG. 2 illustrates generally, by reference numeral 11, an enlarged segment of an intrauterine device in the shape of a loop. The body 8 of the loop is structured in the form of a container with the anti-fertility agent 10 confined in the lumen 9 of the material of the device. The release rate controlling walls or surface 12 of device 15 function to control the rate of release of the anti-fertility agent to the woman's or animal's uterus. While walls 12 of such container can be of any convenient thickness, satisfactory results can be obtained with thickness of 0.001 to 0.10 inches and more preferably between 0.005 and 0.05 inches. The diameter of the lumen 10 can be of any convenient size consistent with obtaining reasonable dimension for the overall diameter of the body of the device. Diameters from 0.05 to 0.2 inch are acceptable. The cross-section of the body 8 can be round or otherwise, with the former preferred for reasons of ease of fabrication. The intrauterine device 15 can be fabricated by molding a solid rod of the desired material and overall outside dimension having embedded therein a wire of same diameter as the desired dimensions of the lumen 10. After the molding operation, the wire can be removed resulting in the structure depicted in FIG. 2. The device can then be suitably filled with the desired anti-fertility agent and sealed to retain the agent therein. The anti-fertility agent, when incorporated into devices of the type disclosed in FIG. 2, can be admixed in a suitable carrier, for example cured solid silicone and the like, if desired.

FIG. 3 illustrates by general reference numberal 13 an enlarged segment of an intrauterine device 15 in the shape of a loop wherein anti-fertility agent 10, illustrated as crystal dots, is distributed throughout the material forming device 15. The material, when similar to entire device, also serves as the matrix for the controlled rate of release of the anti-fertility agent to the uterus. A device such as depicted in FIG. 3 can be fabricated by adding the agent to the matrix material in liquid form in a suitable mold and subsequently converting the matrix to a solid or gel by curing or cooling; or by immersing the solid matrix in the agent or a solution which converts to a solid of the agent to effect diffusion of the agent into the matrix.

Figure 4:
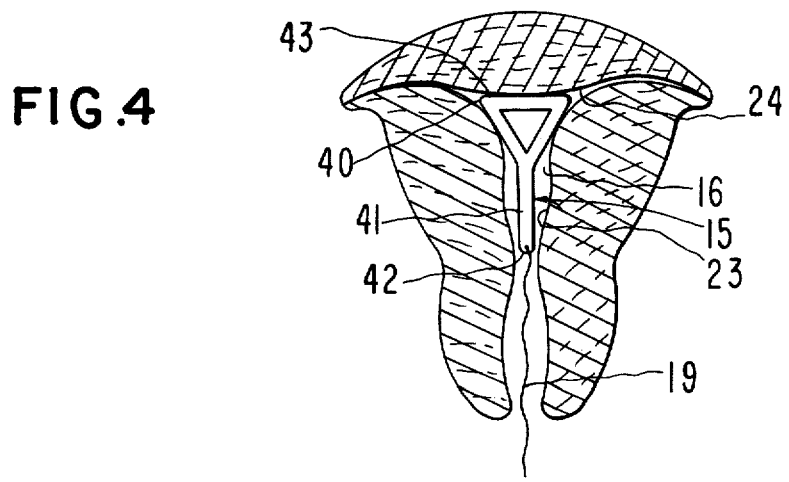
FIG. 4 depicts an intrauterine agent release rate device in a fertile uterus in useable, operable functional phase.

FIG. 4 illustrates an intrauterine device 15 in the uterus of a child-bearing woman uterus 16. Device 15 is a triangular shape 40, formed with a stem 41 for releasing agent in uterus 16. A string 19 is fixed to the trailing end 42, opposite lead end 43, for removing device 15 from uterus 16.

Devices containing the anti-fertility nucleic acid like agent are formed at least in part of a non-toxic material permeable to the compounds to permit passage of these agents through the walls or body of the device at a relatively low rate by a process called diffusion. The rate of passage of the agent through the wall or body is effected by the mechanisms of permeation and diffusion and is therefore dependent on the porosity of the wall or body or the diffusivity and solubility of the agent in the wall or body, as well as on the wall or body thickness. The mechanism by which diffusion is achieved may be explained on the basis of an activity or chemical potential gradient wherein the enclosed substance relieves its internal concentration by spreading ou into the adjacent medium. As the migrant agent is removed from the outer surface of the device by body fluids and tissue absorption, the diffusive action continues until the source of the agent has been substantially consumed. The anti-fertility agent will have a definite and characteristic rate of passage through the body of the device which will, in effect, establish the dosage rate and amount of agent released from the surface during a given time interval. This means that selection of appropriate materials for fabricating the device will be dependent on the particular anti-fertility agent to be used. By varying the composition, porosity and thickness of the device wall or body, the release rate per area of device can be controlled; for the walls or body of the device act as solubility membranes or diffusion control systems to regulate or meter the flow of anti-fertility agent from the device to the uterine walls. Thus, devices of the same surface area can provide different release rates and therefore daily dosages of the agent by varying the characteristic of the device. The anti-fertility agent is metered through the walls or body of the device to the uterus of the patient, with the rate controlled by the composition, porosity and thickness of the walls or body of the device. In each instance, the device acts as a depot for the storage and continuous release of the agent to the uterus.

The amount of anti-fertility agent to be incorporated in the device to obtain the desired contraceptive effects will vary depending upon the permeability or solubility of the particular agent to be used, the material employed to fabricate the device and the length of time the device is to remain inserted in the uterus. Since this device is designed to control fertility for an extended period of time, such as 1 hour to 3 or more years, there is no critical upper limit on the amount of agent incorporated into the device. The lower limit is determined by the fact that sufficient amounts of the agent must remain in the device to maintain the desired dosage. Generally, the intrauterine devices will contain from 250 nanograms to 5 grams, or more of agent. In order to achieve a contraceptive effect in a human adult female, the daily release dosage should be in the range of between 1 and $5 \times 10^6$ micrograms per day, and preferably between 1 micrograms to 2000 micrograms of agent per day. Thus, for example, using cyclic AMP and with a device intended to remain in place for 1 year, and with a release rate of 500 micrograms of cyclic AMP per day, approximately 200 mg of cyclic AMP would be incorporated in the device and is released essentially free from unwanted side effects often associated with these compounds. Further, depending on the particular species of patient to be treated, such as mammals, farm animals, e.g. cows, sheep, the devices of the invention releases a fertility suppressing amount of anti-fertility agent in the range of about 1 microgram to 2000 micrograms per kilogram of body weight per patient per day.

The invention's use of nucleotide-like compounds for interfering with the reproductive process is unexpectedly locally achieved by the invention's release of cyclic nucleotides within a viable, female uterus substantially free of any systemic effect as known for these compounds. For example, the systemic action is reported in *Chem. Abst.*, Vol. 67, page 50731p, 1967 for *Biochem. J.*, Vol. 104, pages 725 to 730, 1967; and as reported in *Chem. Abst.*, Vol. 73, page 685p, 1970 for *Gonads*, pages 27 to 54, 1969, wherein it is reported intravenously administered adenosine 3',5'-(cyclic)-monophosphate and the like act as a mediator of lutenizing hormone on progestational steroid synthesis. The compound is reported to act on the hypothalamus and controls the release and synthesis of pituitary hormones and lutenizing and follicle-stimulating hormones. That is, the reported results are systemic and foreign to the spirit of this invention. Also, the action is reported in *Chem. Abst.*, Vol. 74, page 50167d, 1971 for *Fed. Proc. Fed. Amer. Soc. Exp. Biol.*, Vol. 29, No. 6, pages 1875 to 1879, 1970; similarly in *Chem. Abst.*, Vol. 68, page 20305k, 1968 for *Arch. Biochem. Biophys.*, Vol. 122, No. 2, pages 449 to 465, 1967, where the broad systemic biosynthetic parameters known for these compounds again is reported totally devoid of any suggestion of useful applications for local contraceptive purpose. In *Chem. Abst.*, Vol. 71, page 100118d, 1969 for *J. Obstet. Gynecol.*, Vol. 105, No. 1, pages 121 to 123, 1969, cyclic AMP administered intrapertioneally inhibited ovulation. That is, the reported action is systemic on the pituitary hypothalmus axis while the purpose of this invention is to achieve its ends without inhibiting ovulation. A like administration and result is reported in *Chem. Abst.*, Vol. 75, page 84810g, 1971 for *Am. J. Obstet. Gynecol.*, Vol. 109, No. 5, pages 724 to 731, 1971, and in *Fed. Proc.*, Vol. 29, pages 1875 to 1879, 1970. According to the mode and manner of the present invention, a new and different result is now made available to the art by using the invention's dose situ response relationship.

The present invention slowly and locally releases the azophospho compounds in small amounts over a prolonged period of time to achieve a novel result that overcomes the above-reported disadvantages. The unique objects of this invention are achieved by releasing, for example in a woman, locally an effective amount for interfering with the reporductive process from 1 µg to 2000 µg over 24 hours. That is, systemic effects and systemic application are beyond the scope of this invention.

Material having the ability to control the rate of release of agent in the desired range is herein defined as a "release rate controlling material". These materials are those useful polymers which, in addition to being permeable to and compatible with the anti-fertility agent and uterine environment, are non-toxic, biologically inert. Exemplary materials include hydrophobic polymers such as plasticized or unplasticized polyvinylchloride, plasticized nylon, plasticized soft nylon, plasticized polyethyleneterephthalate, natural rubber, $C_2$–$C_4$ ofefins, for example, polyethylene, polyisoprene, polyisobutylene, polybutadiene; silicone rubbers, especially the medical grade polydimethylsiloxanes, as described in U.S. Pat. No. 3,279,996; hydrophilic polymers such as the hydrophilic hydrogels of esters of acrylic and methacrylic acid as described in U.S. Pat. Nos. 2,967,576 and 3,220,960 and Belgian Pat. No. 701,813; modified collagen, cross-linked polyvinylalcohol, and cross-linked partially hydrolyzed polyvinylacetate. Polymeric materials that tend to be irritating can be used but should be coated with a non-irritating polymeric coating. When plasticizers are used to impart flexibility to the polymer, various plasticizers known to the art can be employed, such as long-chain fatty amides, higher alcohols, and high boiling esters such as di(isooctyl) sebacate or di(2-ethyl hexyl) phthalate.

The intrauterine device of the invention is easily fabricated as previously discussed in connection with the description of FIGS. 1 through 4. Using FIG. 3 as an example, agent first is mixed with the matrix material, which can be in solid, semi-solid, or liquid form at the time, and distributed therethrough by ball-milling, calendering, stirring, shaking, or the like. Where the compound is chemically compatible with monomers or prepolymers used to form the matrix, the agent particles can be added at this earlier stage and the matrix formed in situ. The matrix material, however made and having the agent distributed therethrough, can then be formed to a solid shape by molding, casting, pressing, extruding, drawing, or like processes and conventional techniques. Depending on the material used to form the matrix, curing may be necessary at this stage. This ability to shape the matrix into tubes, loops, rods, disks, rings and other highly reproducible shapes of controllable composition, results in ready fabrication of devices with closely controlled characteristics.

Those skilled in the art can readily determine the rate of permeability of an agent through a polymeric material or selected combinations of polymeric materials. One that has been found to be eminently well suited is to cast or hot press a film of the material to a thickness in the range of 2 to 60 mils. The film is used as a barrier between a rapidly stirred (e.g. 150 r.p.m.) saturated solution of agent containing excess compound and a rapidly stirred solvent bath, both maintained at constant temperature (typically 37°C). Samples are periodically withdrawn from the solvent bath and analyzed for agent concentration. By plotting agent concentration in the solvent bath versus time, the permeability constant P of the membrane is determined by the Fick's First Law of Diffusion.

$$\text{Slope of plot} = \frac{Q_1 - Q_2}{t_1 - t_2} = P \frac{AC}{h} \quad \text{I}$$

wherein $Q_1$ = cumulative amount of agent in solvent in micrograms at $t_1$
$Q_2$ = cumulative amount of agent in solvent in micrograms at $t_2$
$t_1$ = elapsed time to first sample, i.e. $Q_1$
$t_2$ = elapsed time to second sample, i.e. $Q_2$
$A$ = area of membrane in $cm^2$
$C$ = saturation concentration of agent in solution
$h$ = thickness of membrane in cm.

By determining the slope of the plot, i.e.

$$\frac{Q_1 - Q_2}{t_1 - t_2}$$

and solving the equation using the known or measured values of A, C, and h, the permeability P constant in $cm^2$/time of the material or membrane for a given compound is readily determined. Of course, this permeability constant is an inherent characteristic of the material for a given compound. Using the above technique, the permeability constant P for a select membrane and compound can be determined. These data can then be employed to design a device of the invention to release the anti-fertility agent to the uterus in the desired dosage range. Similarly, this experimental procedure or others known to those skilled in the art can be used to determine release rates for matrices and combinations of matrices and matrix with microcapsules of suitable polymeric materials as above disclosed in order to design intrauterine devices of this invention. These examples and like examples can be used to determine the rate of compound released through release rate controlling materials as known to the art in *J. Pharm. Sci.*, Vol. 52, pages 1145 to 1149, 1963; ibid, Vol. 53, pages 798 to 802, 1964; ibid. Vol. 54, pages 1459 to 1464, 1965; ibid. Vol. 55, pages 840 to 843 and 1224 to 1239, 1966; *Encyl. Polymer Sci. Technol.*, Vol. 5 and Vol. 9, pages 65 to 82 and 794 to 807, 1968; and the references cited therein and the like.

Alternatively, in certain cases equation II below can be employed to design the intrauterine device of this invention without the use of any experimental data by computations well known to those skilled in the art of polymer permeation. See for example, "*Advances in Separation and Purification*", Chapter 5, A. S. Michaels, entitled "Principles of Membrane Permeation Theory and Practice" (Interscience Publishers, N.Y. 1968). Initially, of course, it is necessary to select the specific shape and size and thereby establish the surface area of the device and, also, the anti-fertility agent and materials which are to be used.

For a compound utilized in the present invention having a molecular weight under ca. 400, e.g. cyclic AMP, the diffusion coefficient in most non-glassy polymers will be in the range of $1 \times 10^{-9}$ $cm^2$/sec. to $5 \times 10^{-9}$ $cm^2$/sec. at mammalian body temperature. In such cases the "specific permeation flux" of the compound is defined as the product of the permeation flux J, and the film thickness, $t$, through the polymer is given by the equation;

$$Jt = C^* D \quad \text{II}$$

wherein $J$ is the permeation flux; $C^*$ is the concentration of the compound; $D$ is the diffusivity of the compound in the polymer; and $t$ is the film thickness of the polymer wall. The saturation concentration in a particular polymer can be calculated with good accuracy if the solubility of the compound in an organic liquid of chemical constitution similar to that of the polymer is known. For example, the solubility of a particular compound in polyvinyl acetate will be nearly the same as its solubility in ethyl acetate; in polyethylene, nearly the same as in octane or cyclohexane, etc.

Thus, the solubility of cyclic AMP in polyethylene at 25°C is estimated to be ca. 1 gm/1000 gm. Hence, the specific permeation flux of cyclic AMP through low density polyethylene can be calculated to be:

$$Jt = (1 \times 10^{-3} \text{ gm/gm}) (5 \times 10^{-9} \text{ cm}^2/\text{sec}) = 5 \times 10^{-12} \text{ cm}^2/\text{sec}$$

wherein $C^*$ is $1 \times 10^{-3}$ gm/gm; $D$ is $5 \times 10^{-9}$ $cm^2$/sec.

An intrauterine device designed to release 200 micrograms of cyclic AMP per day, or $2 \times 10^{-4}$ grams/day, which has an external surface area of 10 cm², if comprised of low density polyethylene, must therefore have an external membrane wall thickness of:

$$t = \frac{(5 \times 10^{-12})(10)}{(2 \times 10^{-4})\left[\frac{1}{86,400}\right]} = 0.02 \text{ cm}$$

or 2 millimeters (8 mils), wherein 86,400 is the number of seconds in a day; $2 \times 10^{-4}$ is the grams of cyclic AMP to be released per day and 10 cm² is the external surface area of the device. Thus, using this technique, it can be determined that an intrauterine device having a surface area 10 cm² and made of a polyethylene film 8 mils thick, will release 200 micrograms of cyclic AMP per day.

The following examples will serve to further illustrate the invention without in any way being limiting thereon, as these examples and other examples thereof will become apparent to those versed in the art in the light of the present disclosure, the drawings, and the accompanying claims.

EXAMPLE 1

An intrauterine device is fabricated of low density polyethylene tubing of circular cross section, measuring 14 cm in extended length and 3 mm outside diameter having a total external surface area of ca. 5 cm². The device has a shape of a hollow coil of total curvature of 480° and outside coil diameter of 3 cm having a bore of 2.6 mm diameter through its entire length. A twelve month supply of cyclic AMP is inserted into the device. The amount is computed to be:

, (0.2 mg/day) × (365 days/yr) = 73 milligrams

Since the density of cyclic AMP is 1.2 gm/cc, the volume occupied by the compound is ca. 0.07 cc which can be easily inserted as a core in the above device. An amount in the order of 10 to 30% in excess of 73 milligrams can be used, if desired, to insure adequate delivery during the time period. The ends are sealed using polytetrafluoroethylene plugs and cyanoacrylate adhesive (Eastman 910). The device can be used for conception control by surgical insertion into each uterine horn of a 120 pound ewe. Each device releases and supplies approximately 200 micrograms of cyclic AMP per day for a period in excess of 1 year. It is highly preferred that the device be placed in both uterine horns in order to insure that conception is prevented, substantially free of systemic effects.

EXAMPLE 2

One hundred milligrams of cyclic AMP are inserted into a hollow tube of low density polyethylene 10 cm in length and having an inside diameter of 2.6 mm and an outside diameter of 3.0 mm. The tube is sealed in the same manner in Example 1 above. An IUD in the shape of a Lippes' loop is then fabricated from ethylene vinylacetate copolymer (84% ethylene, 16% vinylacetate) by injection molding, having a total straightened length of 4.5 inches. The length of polyethylene tubing prepared above is secured to the body of the loop with cyanoacrylate adhesive (Eastman 910). This device can be used to control conception of a 150 pound ewe by insertion through the cervical os into the uterus. The device will release approximately 140 micrograms of cyclic AMP per day for a period in excess of one year. The ethylene vinylacetate copolymer as used for the fabrication of intrauterine devices does not constitute a part of this invention. Ethylene vinylacetate copolymer used for fabricating drug delivery devices including intrauterine devices is the invention disclosed and claimed in copending U.S. patent application Ser. No. 80,531, filed Oct. 14, 1970 now abandoned, and U.S. patent application Ser. No. 281,446, filed on Aug. 17, 1972. Both of these applications are assigned to the same assignee of this invention and they are incorporated herein by reference.

EXAMPLE 3

Uterine devices providing effective local fertility suppression are prepared by repeating the procedure of Example 1 with substitution of cyclic AMP by each of the following anti-fertility heterocyclic agents:
2'-O-monoacetyl-adenosine-3',5'-monophosphate,
$N^6$-monoacetyl-adenosine-3',5'-monophosphate,
$N^6$-2'-O-diacetyl-adenosine-3',5'-monophosphate,
2'-O-monobutyryl-adenosine-3',5'-monophosphate,
$N^6$-monobutyryl-adenosine-3',5'-monophosphate,
$N^6$-2'-O-dibutyryl-adenosine-3',5'-monophosphate, and
$N^6$-monohexanoyl-adenosine-3',5'-monophosphate.

EXAMPLE 4

An intrauterine anti-fertility device shaped like a triangle with a stem outwardly extended from one of the angles is made of uterine acceptable, release rate controlling medical grade commercially available polydimethylsiloxane tubular film as follows: first, a section of tube 80 mm long with an internal diameter of 4 mm is placed into a triangular mold having three 20 mm legs and an outwardly extended stem of 20 mm, and the mold heated to form the desired shape. Next, one end of the tube is sealed with a nylon plug and the device filled with solid, crystalline $N^6$-2'-O-dihexanoyl-adenosine-3',5'-monophosphate. The remaining opened end is similarly closed to give a reliable intrauterine device.

EXAMPLE 5

Repeating the procedures fully described in Examples 1 and 4, intrauterine devices shaped like a spiral, a closed ring, multiloop, and double circle made of polyisoprene, and modified collagen, and filled with 2'-O-mono-octanoyl-adenosine-3',5'-monophosphate, or $N^6$-2'-O-dioctanoyl-adenosine-3',5'-monophosphate, and mixtures thereof in the ratio of 1 to 1 and 1 to 2 are manufactured for use an intrauterine devices for fertility control in women of 30 kg to 80 kg, lower or higher, for a prolonged period of time.

EXAMPLE 6

Dry crystalline $N^6$-2'-O-dibutyryl-adenosine-3',5'-monophosphate (50 milligrams) is mixed with room temperature vulcanizing liquid polydimethylsiloxane (500 milligrams, Dow Corning medical Silastic 382 elastomer). After uniformly mixing the cyclic AMP with the unvulcanized silicone rubber, a stannous octoate catalyst (0.5% by weight) is added and the mixture is molded into a rod 2 millimeters in diameter in the shape of a Lippes' loop. The resulting silicone rubber intrauterine contraceptive device is allowed to cure at room temperature for 4 days prior to use. When inserted in the uterus of a human adult female by conventional means, this device releases about 200 micrograms of anti-fertility agent per day to the uterine wall for 4 hours to 18 months. It is found that the device is non-irritating to the uterus and provides an effective means of local fertility regulation.

EXAMPLE 7

Repeating the procedure of Example 6, the device is manufactured as described except that the crystalline compound is replaced with the following compounds:
$N^6$-monolauryl-adenosine-3',5'-monophosphate;
$N^6$-monostearyl-adenosine-3',5'-monophosphate;
2'-O-monooleoyl-adenosine-3',5'-monophosphate;
adenosine-3',5'-monomethylphosphate; or
adenosine-3',5'-monoethylphosphate.

EXAMPLE 8

Dry crystalline cyclic AMP (500 milligrams) is mixed with hydroxyethylmethacrylate (9.9 grams), water (1.1 grams) and isopropyl percarbonate (0.2 grams). The mixture is poured into a Teflon lined mold having an ellipsoidal cavity 1 inch by 1.5 inch containing 0.5 inch of a 6 inch nylong string and polymerized at 60°C for 2 hours under a nitrogen atmosphere. After removal from the mold, the capsule is soaked in distilled water for 48 hours to leach out residual monomer. The capsule is then coated with a flexible membrane having a thickness of 0.5 millimeter by dipping in a chloroform solution of 50—50 copolymer of n-butyl and isobutyl-methacrylate. After drying, a hydrophilic coating is applied to the capsule by dipping in a prepolymer of polyhydroxyethylmethacrylate (prepared from hydroxyethylmethacrylate and 0.02% isopropylpercarbonate at 35°C for 0.5 hour) containing 0.02% fresh isopropylpercarbonate; the coating is cured at 55°C for 1 hour in a nitrogen atmosphere after which residual monomer is removed by soaking in distilled water for 48 hours. The resulting flexible, resilient, bulbous capsule has a soft hydrophilic surface and contains about 450 milligrams of cyclic AMP. When inserted in the uterus of a human adult female, it releases about 0.5 milligrams of cyclic AMP per day and provides an effective means of birth control for up to 1 year. Cyclic AMP release rate from the capsule is constant over time as lipoidal materials are not absorbed by the capsule surface. The capsule is removed by pulling on the nylon string.

EXAMPLE 9

The procedure of Examples 2 and 7 are repeated except that the cyclic AMP is replaced with 250 milligrams of $N^6$-2'-O-dibutyryl-adenosine-3',5'-monophosphate. The resulting uterine capsule provides an effective means of birth control by releasing about 250 micrograms per day of the anti-fertility agent.

EXAMPLE 10

Uterine capsule is made by coating a solution of poly-n-butylmethacrylate (1 gram) in chloroform (3 milliliters) onto two hemispherical polypropylene forms having a diameter of 1.3 inch. After drying at 35°C for 1 hour, the cast hemispheres are removed from the forms. Cyclic AMP (500 milligrams in water) is evenly applied to the inside surface of each hemisphere and allowed to dry. The hemispheres are assembled into spherical form by heat sealing their edges. Thereafter, a polyhydroxyethylmethacrylate coating is applied as in Example 2. The resulting capsule is effective to control fertility by releasing about 500 micrograms per day of cyclic AMP to the uterine walls of a human adult female.

EXAMPLE 11

Uterine capsule is made by bending sections of polydimethylsiloxane tubing (Dow Corning, Silastic) having an inside diameter of 0.062 inch and an outside diameter of 0.125 inch to semicircles with a radius of 0.5 inch. Each section is filled with $N^2$-2'-O-dihexanoyl-adenosine-3',5'-monophosphate and the ends sealed with silicone rubber adhesive (Dow Corning, Silastic Medical Adhesive Silicone Type A). The filled semicircular sections are bound together in circular configuration using polyethylene collars. When inserted into the uterine cavity of a human adult female through the cervix in an extended configuration, the capsule resumes its circular shape. It provides effective fertility suppression by releasing the antifertility agent over a long period of time in a continuous manner.

EXAMPLE 12

Example 10 is repeated except that $N^6$-2'-O-dihexanoyl-adenosine-3',5'-monophosphate is replaced by each of the following:
2'-O-monoacetyl-adenosine-3',5'-monophosphate;
$N^6$-monoacetyl-adenosine-3',5'-monophosphate;
$N^6$-2'-O-diacetyl-adenosine-3',5'-monophosphate;
2'-O-monobutyryl-adenosine-3',5'-monophosphate;
$N^6$-monobutyryl-adenosine-3',5'-monophosphate;
$N^6$-2'-O-dibutyryl-adenosine-3',5'-monophosphate;
$N^6$-monohexanoyl-adenosine-3',5'-monophosphate;
2'-O-monooctanoyl-adenosine-3',5'-monophosphate;
$N^6$-2'-O-dioctanoyl-adenosine-3',5'-monophosphate;
$N^6$-monolauryl-adenosine-3',5'-monophosphate;
$N^6$-monostearyl-adenosine-3',5'-monophosphate;
2'-O-monooleoyl-adenosine-3',5'-monophosphate;
adenosine-3',5'-monomethylphosphate; or
adenosine-3',5'-monoethylphosphate.
In each instance, the uterine capsule proves effective in suppressing fertility.

This invention provides a reliable means of fertility control. By releasing the cyclic compounds, cyclic AMP, and its derivatives to the uterus, the desired anti-fertility effect is achieved without obtaining unwanted and possibly toxic systemic progestational activity, estrogenic activity, and other side effects which are unexpected in the light of the prior art. And, while the invention has been described with reference to certain preferred embodiments thereof, and wherein the improvements comprising the invention are also set forth, those skilled in the art will appreciate that various modifications, changes, omissions and substitutions can be made without departing from the spirit of the invention. It is intended, therefore, that the invention be limited only by the scope of the following claims.

What is claimed is:

1. An intrauterine delivery device adapted for insertion and retention in a uterine cavity for the administration of pharmaceutically acceptable antifertility agent to the uterine cavity comprising a uterine acceptable matrix or hollow body of non-toxic, biologically inert, polymeric release rate controlling material containing therein a locally contraceptively active antifertility agent of the structural formula:

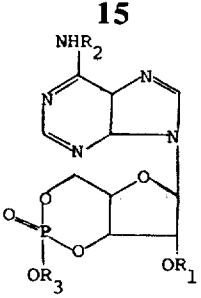

wherein $R_1$ is a member selected from the group consisting of hydrogen, lower alkyl of 1 to 7 carbon atoms and aliphatic acyl of 1 to 18 carbon atoms; $R_2$ is a member selected from the group consisting of hydrogen, lower alkyl of 1 to 7 carbon atoms, and aliphatic acyl of 1 to 18 carbon atoms; $R_3$ is a member selected from the group consisting of hydrogen and lower alkyl of 1 to 7 carbon atoms, and the pharmaceutically acceptable addition salts thereof, and wherein the device, while in the uterus, continually meters the flow of a contraceptively effective amount of agent up to 2000 micrograms per day, for a local antifertility effect through the uterine acceptable polymeric material at a controlled and predetermined rate over a prolonged period of time.

2. The intrauterine delivery device of claim 1 wherein the device releases the locally active anti-fertility agent is a member selected from the group consisting of adenosine-3',5'-monophosphate; 2'-O-monoacetyl-adenosine-3',5'-monophosphate; N⁶-monoacetyl-adenosine-3',5'-monophosphate; N⁶-2'-O-diacetyl-adenosine-3',5'-monophosphate; 2'-O-monobutyryl-adenosine-3',5'-monophosphate; 2'-O-monobutyryl-adenosine-3',5'-monophosphate; N⁶-monobutyryl-adenosine-3',5'-monophosphate; and N⁶-2'-O-dibutyryl-adenosine-3',5'-monophosphate.

3. An intrauterine delivery device for the administration of a physiologically compatible heterocyclic compound for interfering with the reproductive process to the uterine cavity comprising an uterine acceptable matrix or hollow body of non-toxic, biologically inert polymeric release rate controlling material and having therein 250 nanograms to 5 grams of a locally contraceptively active heterocyclic compound and permeable to the passage of the compound by diffusion, and wherein the intrauterine device while in the uterus continuously meters the flow of an effective amount of the compound up to 2000 micrograms per day for an antifertility effect through the uterine acceptable polymeric material at a controlled and predetermined rate over a prolonged period of time with the compound consisting of a member selected from the group consisting of a compound of the formula:

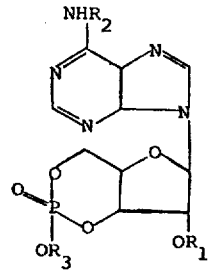

wherein $R_1$ is a member selected from the group consisting of hydrogen, low alkyl of 1 to 7 carbons and aliphatic acyl of 1 to 18 carbons; $R_2$ is a member selected from the group consisting of hydrogen, lower alkyl of 1 to 7 carbons and aliphatic acyl of 1 to 18 carbons; $R_3$ is a member selected from the group consisting of hydrogen and lower alkyl of 1 to 7 carbons, and the pharmaceutically acceptable acid addition salts thereof, and wherein the device while in the uterus, continuously meters the flow of a predetermined and contraceptively effective amount of the compound from the polymeric material to the uterus over a prolonged period of time whereby effective fertility suppression is achieved essentially without systemic effects.

4. An intrauterine delivery device for the administration of a heterocyclic compound for interfering with the reproductive process according to claim 3 is a member selected from the group consisting of adenosine-3',5'-monophosphate; 2'-O-monoacetyl-adenosine-3',5'-monophosphate; N⁶-monoacetyl-adenosine-3',5'-monophosphate; N⁶-2'-O-diacetyl-adenosine-3',5'-monophosphate; 2'-O-monobutyryl-adenosine-3',5'-monophosphate; N⁶-monobutyryl-adenosine-3',5'-monophosphate; and N⁶-2'-O-dibutyryl-adenosine-3',5'-monophosphate.

* * * * *